United States Patent [19]

Mayer

[11] 4,078,534

[45] Mar. 14, 1978

[54] ANTI-INTERFERENCE DEVICE FOR INTERNAL COMBUSTION ENGINES

[76] Inventor: Ferdy P. Mayer, 18 rue Thiers, 38000 Grenoble, France

[21] Appl. No.: 688,816

[22] Filed: May 21, 1976

[30] Foreign Application Priority Data

May 21, 1975 France ................................ 75 15745

[51] Int. Cl.² ...................... H04B 15/02; H01R 13/46; F02P 11/00

[52] U.S. Cl. ........................... 123/148 P; 123/148 A; 123/169 PH; 313/134

[58] Field of Search ............ 123/148 A, 148 P, 169 P, 123/169 PA, 169 PH; 313/134; 338/66; 339/143 S; 333/12, 79

[56] References Cited

U.S. PATENT DOCUMENTS

| | | | |
|---|---|---|---|
| 2,173,766 | 9/1939 | Ramsay | 123/148 P X |
| 2,790,053 | 4/1957 | Peterson | 338/66 |
| 2,896,120 | 7/1959 | Spittler | 313/134 X |
| 3,178,661 | 4/1965 | Kirchgessner | 123/148 P |
| 3,191,132 | 6/1965 | Mayer | 333/79 |
| 3,191,133 | 6/1965 | Texsier | 123/148 P X |
| 3,309,633 | 3/1967 | Mayer | 333/79 |

*Primary Examiner*—Charles J. Myhre
*Assistant Examiner*—Tony M. Argenbright
*Attorney, Agent, or Firm*—Sughrue, Rothwell, Mion, Zinn and Macpeak

[57] ABSTRACT

The protection against interference emitted by automobile internal combustion engines or other vehicles is provided by an element for a spark plug or for a distributor, comprising a shield 3, a resistor 4 increasing with the frequency to be filtered and a capacitor 5, selected in such a manner that the RC product is higher than the time constant corresponding to the cut-off frequency.

Good reduction of interference is obtained between 10 and 1000 MHz.

16 Claims, 12 Drawing Figures

ANTI-INTERFERENCE DEVICE FOR INTERNAL COMBUSTION ENGINES

BACKGROUND OF THE INVENTION

The present invention relates to anti-interference (antinoise, anti-clutter) devices for automobile internal combustion engines, and more particularly to such devices provided in the end (or cap, terminal) elements of ignition cables.

Anti-interference ignition cables have already been proposed. The technical approach consisted essentially in replacing the high voltage connecting wires (high voltage coil - distributors; distributor - spark plugs) by a wire which sufficiently absorbed the radio frequencies (30 MHz to 200 MHz bands) to diminish the antenna effect to a negligible low value (For a given length of wire, along which travels a high frequency current having a wide band width, the radiation is weaker as the length is made short in relation to length $\lambda_g/2$, where $\lambda_g$ is the corresponding R.F. wavelength).

The oldest solution consisted in utilizing high resistance ignition cables between the spark plug and the distributor and between the distributor and the coil. In order to achieve an adequate absorption effect, it has been conventional to employ a wire of high resistance (several thousands of ohms) in the form of an extremely fine metal wire (for example 2 to 5 hundreths of an mm) and which consequently is fragile, or a tape covered with a resisting metal layer (difficult to manufacture), or a mixture of semi-conductor powders within a support prepared from plastics material (for example carbon powders) which is highly sensitive to temperature variations and with which the metal connections are difficult to produce. These cables also absorb the high and low freqencies since the resistance is the same for all the frequencies and the skin effect is negligible.

An improvement has been obtained with devices based on various physical concepts, i.e.: absorption by dielectric and magnetic losses, absorption by "artificial" skin effect, and absorption by inter-facial losses or pseudo-resonance losses.

Such devices are described for example in U.S. Pat. Nos. 3,191,132, and 3,309,633.

Recent experiments made in the U.S.A. by the Federal Communication Commission, and the legislation established in some other countries (for example Canada) show that initially the frequency band (in respect of which anti-interference is to be achieved ( widens, increasing from 30 MHz to 1000 MHz, and then the suppression must improve still more relative to the old laws, in particular due to world consciousness with regard to electromagnetic compatability within the telecommunications field, and also due to more advanced and also more significant techniques for the measurement of these interference radiations (peak measurements, continuous spectrum readings, overall correlation techniques, etc.).

The anti-interference techniques described hereinabove are inadequate. Thus, it is the object of the invention to improve the performances of the ignition anti-interference devices by acting there were the ignition wires (even though they may be perfect) are not able to act. i.e., at the location of the spark plug head which itself radiates, and also of course the end of the connecting wire, inasmuch as it is imperfect.

The disposing of a filter in a plug connection or a distributor outlet is an old idea; by way of example, there are known:

French Pat. No. 897,207 to FIDES (1943), which utilizes a self-inductance distributed in series with the connection (with or without magnetic permeability) externally of the plug;

U.S. Pat. No. 1,984,526 to GIVEN (1928), utilizing a selfinductance distributed in series externally of or inside the plug (with magnetic permeablity); and German Pat. No. 1,013,924 to SIEMENS (1952), utilizing a choke and/or a resistor (with or without magnetic permeability) in series in the plug, and a shunt capacitor.

These show that the idea of reinforced LR, LCR and RC filters has long been known.

The Standford Research Institute (SRI) has recently developed a plug cap (or end piece) having a filter. This cap is shown in FIG. 1*a* of the accompanying drawings. It comprises a brass cylinder 101 connected to the connection 6 and surrounded by a brass sleeve 102 separated by dielectric 103 such as polytetrafluoroethylene. The central conductor of the plug comprises a localized resistor 104.

FIG. 1*b* shows the attentuation curve of this filter as a function of the frequency, and FIG. 1*c* shows the equivalent electrical diagram, whereas FIG. 1*d* shows a graph illustrating the reduction of interference emission obtained relative to a conventional plug connected by an ordinary resistance wire.

The attentuation of the SRI filter (FIG. 1*b* ) is of the "time constant" type at low frequencies ($<$ 100 MHz) and tends towards a constant value above the same. This conforms to an RC filter comprising an interference capacity in parallel with resistor R (like any resistor) according to the equivalent diagram shown in FIG. 1*c* of the filter of FIG. 1*a*. Resistor R is the series resistor 104 and capacitor Cp the interference or parasitic capacitance.

The curve gives the approximate attentuation values.

13 dB at 10 MHz
18 dB at 20 MHz
20 dB at 30 MHz
24 dB at 50 MHz
28 dB at 100 MHz

Above - 30 dB it is calculated that the R.C. filter has a cut-off frequency of:

$$fc = 1/2\pi\tau) (1/2\pi RC) \cong 2.5 \text{ to } 3 \text{ MHz}$$

with $\tau$, time constant equals 6.26 to $5 \times 10^{-8}$.

From FIG. 1*b* it will readily be deduced that:

$$C \cong 12.5 \text{ pF} \quad (\text{with } \epsilon_p = 2.5 \text{ for teflon})$$

from which $$R \cong 4.4\ k\Omega$$

Furthermore, a layer resistor of this value exhibits a decrease in its impedance from 10 to 20% at 100 MHz, from which there may be deduced an interference capacitance:

$$C_p \cong 0.27 \text{ to } 0.14 \text{ pF.}$$

and a maximum attentuation equal to Cp/C, i.e. 33 to 39 dB - this being a value well confirmed by the curve of the incorporated resistor plug FIG. 1*d* sows the graph having an attentuation $\alpha$in dB as the ordinate, the frequency MHz as the abscissa. The upper curve represents the attentuation for a conventional plug, the intermediate curve for the SRI plug, the lower curve being the difference between the suppression obtained. It will be seen that overall improvement of the order of 12 dB is obtained at the end frequencies, and an improvement 16 to 20 dB around 100 MHz, i.e. an overall improvement (in dB) half the intrinsic attentuation supplied by the filter. Summing up the disadvantages of the "special plug" solution, although the capacitance at high temperature may be achieved relatively readily (teflon, as indicated, or ceramics even for the body of the plug), the resistance (of the order of 5 kΩ) operative at this temperature, with correct reliability, represents problems (within the framework of realistic cost price). In addition, a total resistance of the order of 10 kΩ is to be added in series in the ignition circuit, and all the disadvantages of resistance ignition circuits are present (cold starting, more sensitive European vehicles of the "hot" spark type, sensitivity to leakages, etc). Moreover, any supplementary mass capacitance increases the charge of the high voltage coil (there is added here all in all, 25 pF), and any localized resistance (such as that in the plug) has a disadvantageous interference capacitance effect. In fact, the latter diminishes performance at high frequencies (a decrease from 10 to 20% at 100 MHz being typical for a 5 kΩ resistor). This disadvantage appears clearly when the shunt capacitor is suppressed for the one or other reason (in the case of bad grounding of the reinforcement or shielding). The ascending attentuation curve shows this effect clearly.

The SRI approach necessitates the development of a special plug (non-existing) which is more difficult to produce industrially than is a special cap or wire, for the technological reasons mentioned and also due to the dependance relationship (obligatory with regard to high temperature technologies), and in view of mechanical and electronic aspects. A further aspect is that of the cost on first assembly and on replacement. Since the plugs are changed more frequently than are the ignition cables (and this all the more when they are complex), the economic balancesheet is in favor of an inexpensive plug, this referring of course also to the existing market, within the framework of known and well-tired technologies.

SUMMARY OF THE INVENTION

It is for this reason that the present invention relates to a device operating externally of the spark plug, optionally producing phenomena induced in the plug by coupling.

It is one of the objects of the present ainvention to seek solutions starting, a priori, from a standard plug.

It is the further object of the present invention to utilize resistance or absorbing effects without interference capacitances (Cp), i.e. which are distributed, these effects being direct (element connected galvanically in series with the ignition conductor) or indirect (element "connected" indirectly with the ignition conductor).

It is a further object of the invention to utilize weak low frequency series resistors for the reasons discussed (overall metal connection, with high ignition capacity).

The invention is based on an overall concept, such as a quadrupole (like the SRI filter), but with propagation, i.e. taking account of characteristic impedance, propagation constant, etc, these being phenomena which alone may take account of the effects of radiation, attentuation, pseudo-resonance, etc, all of which are essential with regard to the present solution of the problem.

According to the invention, a reinforced or shielded filter for an ignition spark plug and high voltage distribution system, produced in end or terminal elements or caps for an internal combustion engine ignition cable, utilizing a series resistor R the resistance of which is a function of ω (frequency), increasing with ω and a shunt capacitor C (connected to ground), characterized by the following features:

The filter terminating the high voltage cable serves as a connecting cap and is connected directly to one of the elements comprised within the group, constituted by the plugs, the distributor and the coil.

The resistor R and the capacitor C form a quadrupole and are selected in such a manner that the RC product becomes higher than the time constant corresponding to the cut-off frequency, i.e. RC $$> 1/2\pi fc.$$

The cut-off frequency being the minimum frequency starting from which filter attentuation commences. There is thus introduced a significant reduction of the interference from 10 to 1000 MHz.

The resistor is designed in such a manner as not to exhibit a disadvantageous Parasitic shunt capacitance effect; i.e., its impedance is increasing as a function of the frequency, as may be achieved for example by means of a distributed resistor or a resistor induced by coupling. This shows the importance of the latter factors, R being a function increasing with ω; the resistance must remain limited to the low frequencies in order not to prevent ignition.

The capacitor utilizes a hot electrode of the normal structure of the plug or of the distributor terminal, or the connection thereof with the ignition cable and, optionally, a portion of the ignition cable itself. The capacitance is limited by the maximum charge of the coil.

According to the invention, the absorption effect is utilized, i.e. the utilization of resistance effects increasing with frequency (the resistance R(ω) being an increasing function of the frequency) and also the carrying into effect of these effects to preventinterference capacitance phenomena.

According to the present invention, an attenuation value of 20 to 30 dB, in extremely low volume (under the cap) may be obtained with structures comprising a resistance which does not exhibit a disadvantageous interference shunt capacitance effect.

It is possible to have a localized structure: R (ω) localized with C localized, or a distributed structure: R (ω) distributed with C distributed. In the latter case, R may be constant. It is also possible to have combinations, juxtapositions and superpositions of these structures.

BRIEF DESCRITPION OF THE DRAWINGS

Further features and advantages of the invention will be ascertained from the description given hereinbelow, with reference to the drawings wherein.

DESCRIPTION OF THE PREFERRED EMBODIMENTS

Figure 1A:
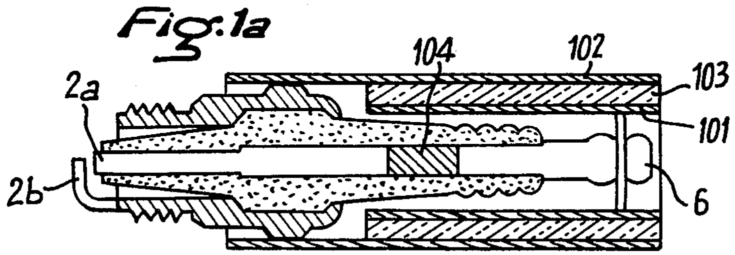
Figure 1B:
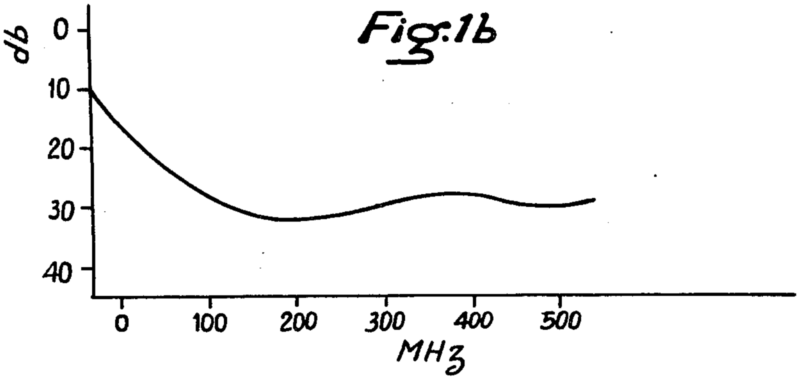
Figure 1C:
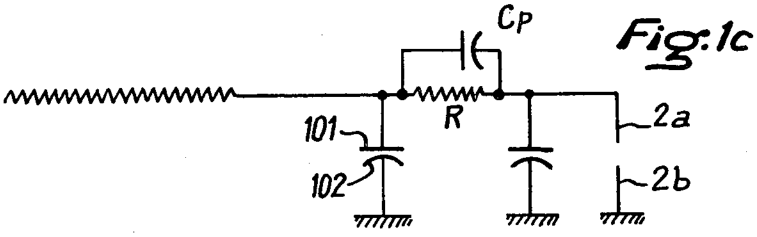
Figure 1D:
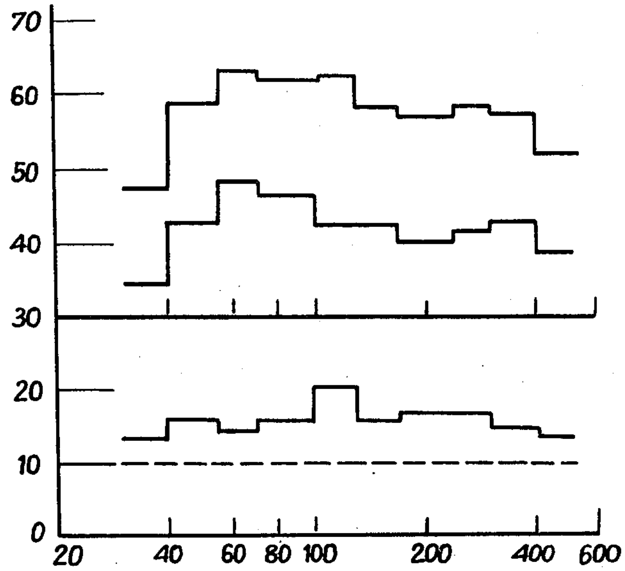

Referring to the various figures, like elements have been given the same reference numerals. In the description following hereinbelow, a resistor, a capacitor and a choke, of fixed value, are designed, respectively, by the conventional letters R, C and L, and R (ω) is used to designate a resistor the resistance of which is a function of the frequency, as described hereinabove. Such resistors are well known and may be manufactured for example by means of ferrite rings or beads (such as the "Ferroxcube" beads manufactured by "RTC, la Radiotechnique Compelec").

Figure 2:
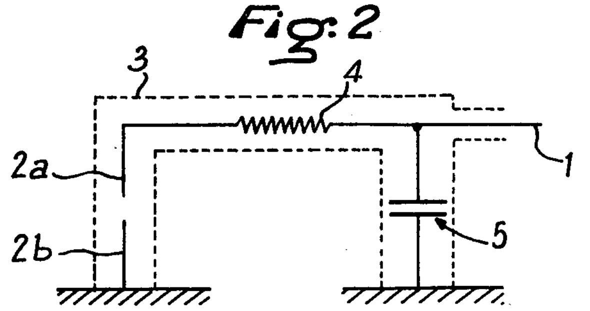
FIGS. 2 to 5 show the equivalent wiring diagrams of various plug caps according to the invention.

FIG. 2 shows the equivalent diagram of a structure with R (ω) localized and C localized. The assembly comprises a connecting cable 1, the electrodes 2a and 2b of the plug, the reinforcement 3 encasing the entire assembly, with the resistor 4 and the capacitor 5. The localized resistor R (ω) may be a small winding on an absorbent ferrite core, or an absorbent mixture containing ferrite, manufactured in accordance with the two U.S. patents mentioned hereinabove, in such a manner as to affort a resistance effect which is greater than the reactive effect L (ω) achieved in this manner. The resistor 4 may also be a ring of ferrite or an absorbent ferrite material surrounding the conductor. In practice, there are obtained for R (ω) the following values (at optimum frequencies):

(1) 30 to 40 Ω with a small ring the external diameter of 3.5 mm, the internal diameter of 1.2 mm, and the length of 3 mm.

(2) 500 to 1000 Ω with a 3 - turn core the external diameter of 9 mm, and the length of 10 mm, with various compact ferrites.

The values of R (ω) remain relatively low. The capacitors C may be constituted by the insulating body itself of the plug (for example German Pat. No. 1,013,924) or by a specially provided capacitor. What is required is a localized capacitor in the two cases, neglecting the propagation delay along the central rod of the plug, this being justified due to a reduced propagation constant.

Figure 3:
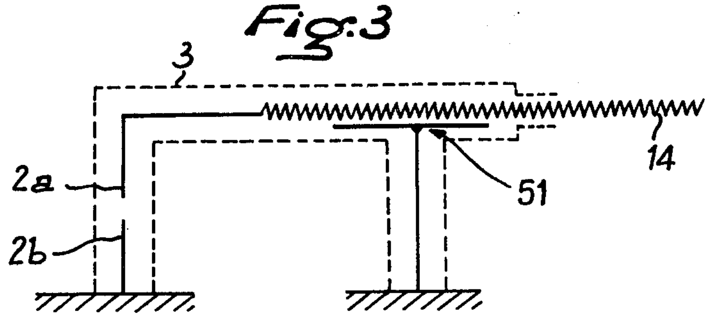

FIG. 3 shows the equivalent diagram of an end structure of type R distributed and C distributed. Here, R has a constant value and is constituted by a resistance ignition wire 14. What is required is the particular case wherein R is constant as a function of the frequency, but distributed, thus eliminating the interference capacitance effects, and more particularly wherein the said resistor R corresponds to a length of ignition wire having a resistance core; this being a case which is interesting in practice due to the considerable use of these ignition wires. The portion of the ignition cable 14 which is within the reinforcement is produced with a distributed capacitor 51 connected to ground.

Employing a 50,000 ohm/meter cable for example, with a capacitance on the sheath of 2pF/cm, a length of 6.5 cm approximately of distributed filter within the cap affords an RC product and performances identical with those of the SRI filter, but without the disadvantage of the special plug.

It is evident that a portion, for example, of the distributed capacitance connected to ground may be located externally of the cap itself, since the latter is directly connected to the ignition wire.

In this latter case, the electrode 51 of the capacitor is prolonged externally of the reinforcement or casing 3.

Figure 7:
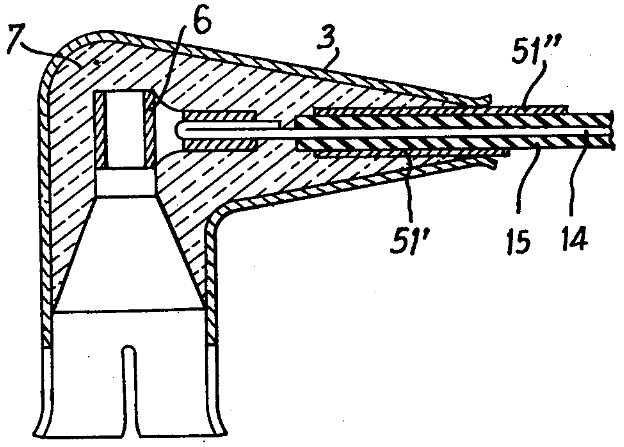

A more interesting variant is obtained if, in the diagram of FIG. 3 and the embodiment of FIG. 7, the distributed resistance wire R is replaced by resistor R(ω) Providing low resistance to the low frequencies. The distributed resistor R (ω) may be provided by an absorbent anti-interference cable terminal, and the distributed capacitor entirely internal or partial externally at the plug cap.

It is interesting to observe the performances which are possible with these devices, by considering the attentuation values measured on a prototype from wire commercially sold under the trademark "Bougicord", which is metallized. Here are some values; Bougicord 420 = between 30 and 500 MHz, α/f equal to or greater than 3 dB MHZ per meter, Bougicord 375:between 30 and 500 MHz, α/f equal to or greater than 15 dB/NHz per meter, where α is attenuation, and *f* is frequency.

The superiority of these processes appears clearly with the numerical data:

First of all, at 30 MHz, attenuation of 1 (or 3) dB/cm indicating that a length of 20 (or 7) cm is this filter is equivalent to the SRI solution described hereinabove. Then at increasing frequencies, the attenuation increases more rapidly than a simple time constant (6dB/octave).

Finally, there is, by definition, no interference effect limiting the attentuation at the high frequencies. Instead of a limitation between 33 and 39 dB (SRI), starting from 100 MHz, with the device according to the invention there is obtained greater than 3 (or 9) dB/cm and the upper limit will depend only on the correct mechanical carrying into effect of the filter and on the reinforcement thereof.

Figure 4:
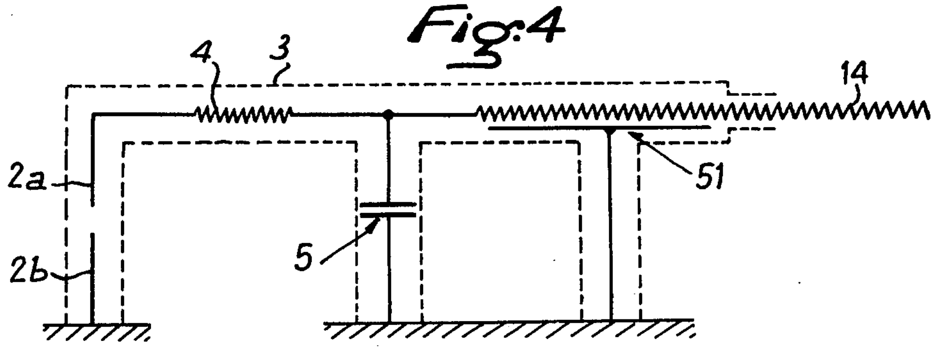
Figure 5:
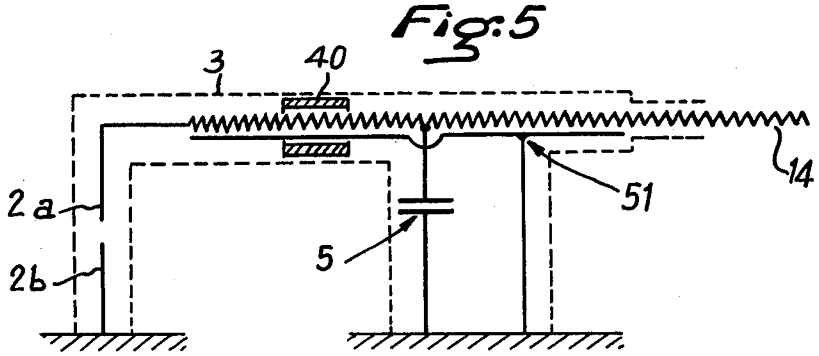

FIGS. 4 and 5 show the wiring diagrams of embodiments resulting from the addition of the two structures discussed hereinabove: R (ω) localized, C localized, R distributed, and C distributed. This addition makes it possible to produce filters of higher order, the two structures being suitable for connection in cascade or superposed. FIG. 4 shows connection in cascade and FIG. 5 superpositioning, with R (ω) indicated schematically in the form of a torus (toroidal core) 40, about the anti-interference wire, with C distributed corresponding to direct reinforcement or shielding on the wire and C localized as a capacitor electrically connected to a length of the wire.

It is clear that although the device of FIG. 4 is implemented in a straight forward way, that of FIG. 5 may be implemented in various ways, depending on the location at which the localized capacitor 5 is connected (to the left, to the right or at the one or other locations in the center of the distributed capacitance). Here again, the distributed capacitance may be situated entirely within the cap, within the reinforcement, or a part thereof may be external. Finally, in this structure, the cable 14, R distributed, may be an resistance cable R (ω), and this improves performance.

It will here be mentioned (and this is valid for all the embodiments of FIGS. 4 and 5) that the performances are limited, a priori, due to the fact that the total shunt capacitance must not exceed values of 10 to 100 pF for example (this being the sum of C localized and C distributed) and that the distributed resistance R (ω) will generally be superior to the localized resistance R (ω) (eliminating the multi-turn resistance R (ω).

The limitation of the performances will thus be essentially due to considerations of complexity, practical implementation and important supplementary technical problems, such as voltage behavior, for example.

The implementation of the resistors or resistances R (ω) has been described hereinabove, i.e. they may be ferrite rings, absorbent ferrite mixtures for localized elements, absorbent antinterefernce wires for distributed elements.

The implementation of the localized capacitance or capacitor has also been described; i.e. utilizing the insulating sheath of the cable, the ceramic mass of the spark plug, or a coaxial, cylindrical, radial capacitor or capacitance, connected galvanically to the hot point, a thermoplastic or thermo-setting insulator having a high dielectric constant charge, for example $TiO_2$, Titanates or a high permittivity absorbent magnetic mixture, etc.

The manufacture of the distributed capacitor or capacitance is identical, except that it is applied to the hot conductor the potential of which varies with length, due to the distributed resistance R or R (ω).

It is clear that the number of different variants of possible embodiments according to these descriptions is relatively large and only some thereof will be explained in detail hereinbelow.

There are now supplied some supplementary points which are generally applicable.

The electrodes (ground electrodes) of distributed capacitances may be produced by any known process such as braiding, metalization employment of metal tubes, utilization of a conductor of semiconductor mixture.

There will also be described a variant employeing a conductive carbon PVC mixture, for producing this capacitance and even overall reinforcement of the end filter.

The ignition wires are produced with relatively thick sheaths which withstand high voltage. One of the preferred processes for introducing the distributed capacitance comprises the application of the foregoing directly on a length of anti-interference wire.

Such a length of "reinforced" anti-interference wire may be lodged within the body of the filter cap; however, it is also possible that a certain length may project, i.e. it may constitute an integral portion of the connecting wire into the open air.

An interesting extreme case is that wherein the external reinforcing sheath is a semiconductor plastics mixture and extends along the entire length of a high voltage connecting wire.

An important aspect in the case of the solutions illustrated in FIGS. 3, 4 and 5, within the transmission line concept, is that relating to characteristic impedance discontinuity at the cap filter outlet. The assembly may then be considered as a line having the linear constants R (ω) and L (ω), but with C variable. Starting from the reinforced or armoured portion (where C is for example equal to a pF/cm) the linear capacitance increases notably, due to the fact that the wire is, in this connecting portion, removed from ground. The result thereof is the variation of the order of 15 to 30 in the characteristic impedance Zc (Zc 1/ Zc 2 = 5 to 30) and losses due to interfacial absorption which are added to the line losses proper. Reference is made to what has been stated hereinabove with regard to pseudo-resonance.

A further interesting case is the following one. The characteristic impedance Zc 1 (of the ignition wire) is poorly defined to the extent that ground (engine, body, etc) is a priori at an optional distance. Now, the attenuation α for a given resistance R (ω), which is characteristic for anti-interference cables, is a function of Zc in a defined structure.

$$\alpha = \text{real part of } \frac{R(\omega) + jL\omega}{Zc} = \frac{1}{2} \; \frac{R(\omega)}{\text{real part of } Zc}$$

and it is important to give Zc a precise value in order to optimize the intrinsic $\alpha_1$ attenuation of the line at $Zc_1$.

Metallization over the whole or a portion of the spark plug wire (conductive or semiconductive) surrounding the whole of the circumference, suffices for defining $Zc_1$ and optimizing $\alpha_1$ of itself. (It is evident that this optimization of $\alpha_1$ of itself is utilizable as an independent solution. It is mentioned within the framework of this specification, due to the existance of practical ground connection via the end element).

As already mentioned, specific media (in particular special charge mixture) may serve simultaneously as magnetic lossey medium (for R (ω) and dielectric medium (for C). In this case, in general, C is not constant but is a function C (ω). A practical example employing a "dielectromagnetic" medium will be described hereinafter.

Mention has also been made of, a priori, poor ground connection. Obviously, the filter must not lose its entire efficacy or even make interference worse than it would without the end cap (this would be so for example in the case of the SRI plug at high frequency in the event of a poor ground connection).

FIGS. 6, 7, 8 and 9 show some examples of practical embodiments, corresponding to the diagrams mentioned hereinabove. From the structural viewpoint, the embodiments apply equally well to straight or curved spark plug connectors.

Figure 6:
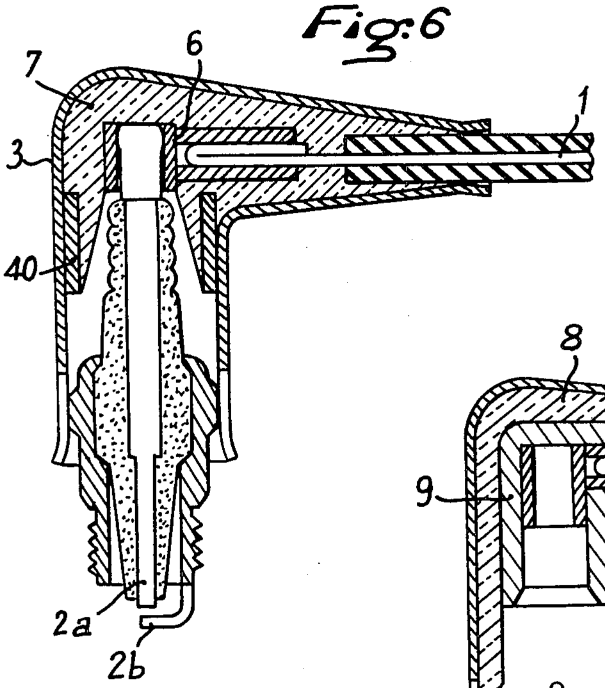
FIGS. 6 to 9 show, in section, plug caps according to the invention.

FIG. 6 shows an embodiment according to the scheme of FIG. 2. The resistance R (ω) is constituted by one (or more) ferrite rings 40 surrounding the plug head. The capacitance C is constituted between the connection and the external metal reinforcement. The dielectric insulator 7 may be of the plastics or elastomer type withstanding high temperature (neoprene, hypalon, silicone) and, in order to provide an adequate capacitance value, it will comprise a ferroelectric charge of the titanium oxide type, etc, permitting the obtaining of the dielectric constant of the order of 10 to 50 without diminution of dielectric rigidity.

As indicated, the ferrite ring may be constituted by a mixture of elastomer (high temperature) and ferrite in granular form, and this same mixture may constitute the insulator (with high ε), if it represents an adequate degree of dielectric rigidity. This corresponds to a particularly simple mode of implementation. (The connection and the output wire terminal is considered as equipotential so that there is also a localized capacitance).

It is clear that this is, strictly speaking, true only if the ignition wire comprises a low resistance metal conductor.

FIG. 7 shows an embodiment corresponding to the scheme of FIG. 3, wherein the plug has been eliminated for clarity of illustration. The end element output or outlet (to the right) shows clearly the design of the ground electrode 51 surrounding the ignition wire. The lower portion 51' corresonds precisely to what is illustrated in FIG. 3, whereas the other portion 51" represents a distributed capacitance the reinforcement of which projects to the exterior of the cap over at least a portion of the ignition wire.

It has already been stated that this reinformcement may be a braiding, metallization, plastics or a semiconductor polymer, or even a mixture which itself is absorbent and semiconductive.

Figure 8:
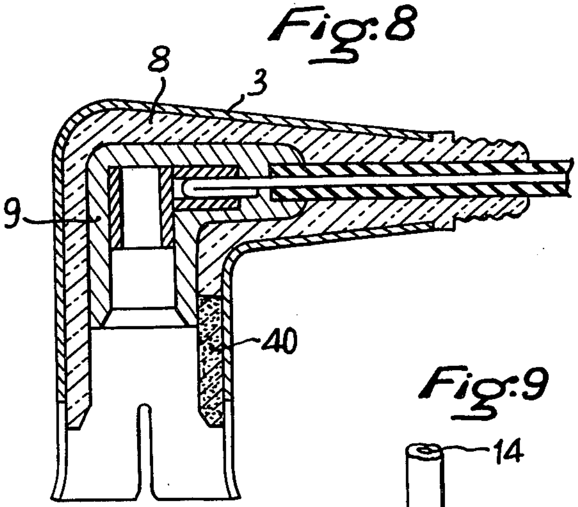

FIG. 8 shows the further embodiment according to the diagram of FIG. 4. The filling 8, which is conductive or semiconductive or of high ε, or is an absorbent mixture, may be produced for example by neoprene charged with carbon or conductive metal powder, or by a semiconductive absorbent mixture. It constitutes the external armouring of a capacitance distributed about the ignition wire. An insulator 9 is provided about the connection. The straight portion of the base of the end element comprises a ring 40 of ferrite or an absorbent mixture constituting a resistance R (ω) which is localized (about the connection), as in the scheme of FIG. 2. In the case of the right-hand half of the Figure, the assembly thus constitutes a filter according to the diagram of FIG. 4.

The left-hand portion illustrates an embodiment without ferrite ring 40 being thus purely the equivalent of the diagram of FIG. 3. The insulating body 9 about the sleeve or case may be molded-on for example, and it exhibits good dielectric properties which withstand voltage.

Figure 9:
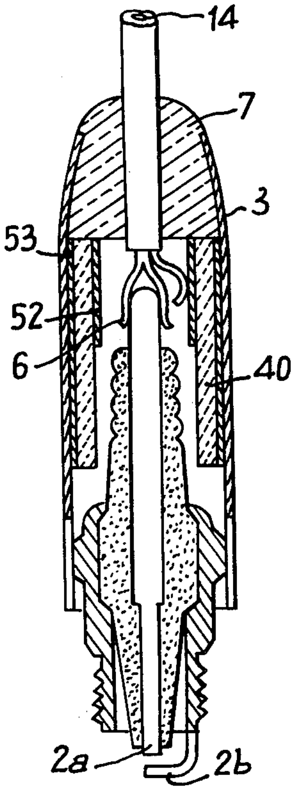

A particularly simple embodiment consists of employing a single semiconductive dielectricmagnetic filling, affording simultaneously the function of R (ω) localized, C localized, and C (ω) distributed about the ignition wire. Thus, it is obviously necessary that this medium should have good dielectric behavior FIG. 9 shows a further embodiment according to the diagrams of FIGS. 4 and 5, wherein the ferrite ring 40 itself serves for affording the localized capacitance of the first element of the filter, due to the metallizations 52 and 53. If the dielectric constant of the insulator 7 is not high, or if it is a conductor or semiconductor, the distributed capacitance (distributed towards the end element outlet) is low, FIG. 9 represents a variant of FIG. 6.

A last particularly simple embodiment of the scheme of FIG. 3 can now be indicated with R (ω) distributed and C distributed. The sleeve or casing is mounted on the absorbent or resistance ignition wire. Then there is a fluid-tight molded-on portion with a good insulator similar to that of FIG. 8. Finally, there is molded-on a semiconductor filling, such as neoprene charged with carbon and, finally, a resilient sheath manufactured from a high temperature elastomer and which is a semiconductor, the said sheath being sufficiently resilient and rigid simultaneously to contact the plug cap (end element).

The utilization for this sheath of a heat-shrinking substance is a supplementary possibility.

Although the diagrams and drawings show only spark plug filters, the same assemblies are utilizable for filters for connection to the coil and to the distributor.

I claim:

1. A reinforced filter for a spark plug and high voltage distribution system for an internal combustion engine ignition cable, employing a series resistor having a resistance R and a shunt capacitor having a capacitance C connected to ground, wherein the filter terminates the high voltage cable and serves as a connecting end element in the high voltage distribution system, the resistance R and the capacitance C form a quadrupole and are selected in such a manner that the RC product becomes higher than the time constant corresponding to the desired cut-off frequency, the resistor is designed in such a manner as not to exhibit a disadvanteous interference shunt capacitance.

2. A filter according to claim 1, wherein the resistor is of the localized type induced by magnetic coupling by one or more structures surrounding the conductor.

3. A filter according to claim 2, wherein the resistor is constituted by one or more rings manufactured from a magnetic high frequency lossey product.

4. A filter according to claim 3, wherein the magnetic high frequency lossey product is a ferrite.

5. A filter according to claim 3, wherein the magnetic high frequency lossey product is a mixture containing ferrite.

6. A filter according to claim 1, wherein the shunt capacitor is of the localized type.

7. A filter according to claim 1, wherein the series resistor is of the distributed type.

8. A filter according to claim 7, wherein the resistor is constituted by a portion of the ignition cable.

9. A filter according to claim 7, wherein the shunt capacitor is distributed along the distributed resistor.

10. A filter according to claim 1, wherein the ground electrode of the shunt capacitor is resistant.

11. A filter according to claim 7, wherein the ground electrode of the shunt capacitor is constituted by a layer surrounding at least partially the resistor distributed over at least a portion of its connection length.

12. A filter according to claim 1, wherein the resistor comprises a localized portion and a distributed portion.

13. A filter according to claim 12, wherein the capacitor comprises a localized portion and a distributed portion.

14. A filter according to claim 1, wherein the resistor has a resistance increasing with frequency ω to be filtered.

15. A filter according to claim 1, wherein the capacitor utilizes as a hot electrode the normal structure of the plug and its connection with the ignition cable.

16. A filter according to claim 1, wherein the capacitor utilizes as a hot electrode the normal structure of the distributor terminal and a portion of the ignition cable.

* * * * *